(12) United States Patent
Ueda et al.

(10) Patent No.: US 11,034,518 B2
(45) Date of Patent: Jun. 15, 2021

(54) PICKING SYSTEM

(71) Applicant: Daifuku Co., Ltd., Osaka (JP)

(72) Inventors: Yuichi Ueda, Hinocho (JP); Masaya Miyamoto, Tokyo (JP)

(73) Assignee: Daifuku Co., Ltd., Osaka (JP)

(*) Notice: Subject to any disclaimer, the term of this patent is extended or adjusted under 35 U.S.C. 154(b) by 77 days.

(21) Appl. No.: 16/412,607

(22) Filed: May 15, 2019

(65) Prior Publication Data
US 2019/0359422 A1 Nov. 28, 2019

(30) Foreign Application Priority Data

May 23, 2018 (JP) .............................. JP2018-099125

(51) Int. Cl.
*B65G 1/137* (2006.01)

(52) U.S. Cl.
CPC .................................. *B65G 1/1373* (2013.01)

(58) Field of Classification Search
CPC combination set(s) only.
See application file for complete search history.

(56) References Cited

U.S. PATENT DOCUMENTS

| | | | |
|---|---|---|---|
| 2007/0071585 A1* | 3/2007 | Henkel ................ | B65G 1/0407 414/471 |
| 2008/0270327 A1* | 10/2008 | Freudelsperger .... | B65G 1/1376 705/500 |
| 2010/0300842 A1* | 12/2010 | Bastian, II ............ | B65G 1/026 198/586 |
| 2012/0101627 A1* | 4/2012 | Lert ...................... | B65G 1/1373 700/216 |
| 2018/0057264 A1* | 3/2018 | Wicks .................. | G06Q 10/087 |
| 2020/0002094 A1* | 1/2020 | Schedlbauer .......... | G07F 17/12 |

FOREIGN PATENT DOCUMENTS

JP 2004189417 A 7/2004

\* cited by examiner

*Primary Examiner* — Kyle O Logan
(74) *Attorney, Agent, or Firm* — The Webb Law Firm

(57) ABSTRACT

A picking system includes: a multi-column sorting device that sorts articles based on an order, and discharges each of the articles into one of a plurality of columns of compartments; a plurality of storage devices that receive the articles discharged from the respective corresponding compartments until article groups that are each a set of the articles for each order have been collected, and temporarily store the articles; and a transport device that receives and unloads the article discharged from each of the storage devices with an accommodating container located at a standby position, and loads an empty accommodating container to the standby position.

9 Claims, 11 Drawing Sheets

PICKING SYSTEM

CROSS-REFERENCE TO RELATED APPLICATIONS

This application claims priority to Japanese Patent Application No. 2018-099125 filed May 23, 2018, the disclosure of which is hereby incorporated by reference in its entirety.

BACKGROUND OF THE INVENTION

1. Field of the Invention

The present invention relates to a picking system.

2. Description of the Related Art

For example, an enterprise that conducts electronic commerce transactions may store various types of articles in a distribution warehouse, and, upon receiving an order, directly send the purchased article from the distribution warehouse to the purchaser. In such a case, a picking system that collects and ships the required article from among a plurality of stored articles is used. An example of such a picking system is disclosed in JP 2004-189417A (Patent Document 1).

The picking system includes, as a sorting device, many carriages 122 each including a sorting tray 121 that can be tilted in a direction orthogonal to the traveling direction. After each carriage 122 has been caused to travel to a desired sorting position, the sorting tray 121 is tilted to discharge the article, and the discharged article is received with a collecting box B, thus performing sorting.

In the picking system disclosed in Patent Document 1, if the number of orders to be collectively processed at a time increases, it is necessary to extend the movable range of the sorting device, and provide an additional collecting box B in the extended area. This results in a poor space efficiency. Furthermore, Patent Document 1 contains no description of unloading of the collecting box B in which the sorted articles are accommodated, or a subsequent process, and no particular consideration has been given for efficient unloading of the sorted articles.

SUMMARY OF THE INVENTION

There is a need for realization of a picking system that can efficiently perform operations from the collection to the shipping of articles in a limited space.

A picking system according to the present disclosure is a picking system that collects and ships a required article from among a plurality of stored articles, the picking system including:

a multi-column sorting device that includes a plurality of columns of compartments having different heights in a vertical direction, and that sorts the articles based on an order, and discharges each of the articles into one of the plurality of columns of compartments;

a plurality of storage devices that are provided in a plurality of columns respectively corresponding to the plurality of columns of compartments, receive the articles discharged from the respective corresponding compartments until article groups that are each a set of the articles for each order have been collected, and temporarily store the articles; and a transport device that receives and unloads the article discharged from each of the storage devices with an accommodating container located at a standby position, and loads an empty accommodating container to the standby position.

With this configuration, the sorting device that sorts articles based on an order is formed by a multi-column sorting device including a plurality of columns of compartments. Accordingly, the number of orders that can be collectively processed at a time can be increased using the columns having different heights in the vertical direction. That is, it is possible to increase the processing efficiency for sorting without expanding the planar installation space of the sorting device. With this configuration, the articles discharged from the compartments are temporarily stored in the storage device until the article groups of each order have been collected, and, thereafter, transferred to the accommodating containers and automatically unloaded by the transport device. As a result of this unloading process, no accommodating container is present on each standby position. To compensate for the absence, an empty accommodating container is automatically loaded by the transport device. In this manner, unloading of the accommodating container in which the article groups of each order are accommodated, and loading of the empty accommodating container are automatically performed by the transport device. Thus, unloading after sorting and preparation for the next unloading can be performed efficiently. As such, it is possible to realize a picking system that can efficiently perform operations from the collection to the shipping of articles in a limited space.

Further features and advantages of the technique according to the present disclosure will become apparent from the following description of illustrative and non-limiting embodiments with reference to the drawings.

DETAILED DESCRIPTION OF PREFERRED EMBODIMENTS

An embodiment of a picking system will be described with reference to the drawings. A picking system 1 according to the present embodiment is provided, for example, in a distribution facility owned by an enterprise that performs electronic commerce transactions, and is used to collect (pick) and ship a required article A from among a plurality of stored articles A.

Figure 1:
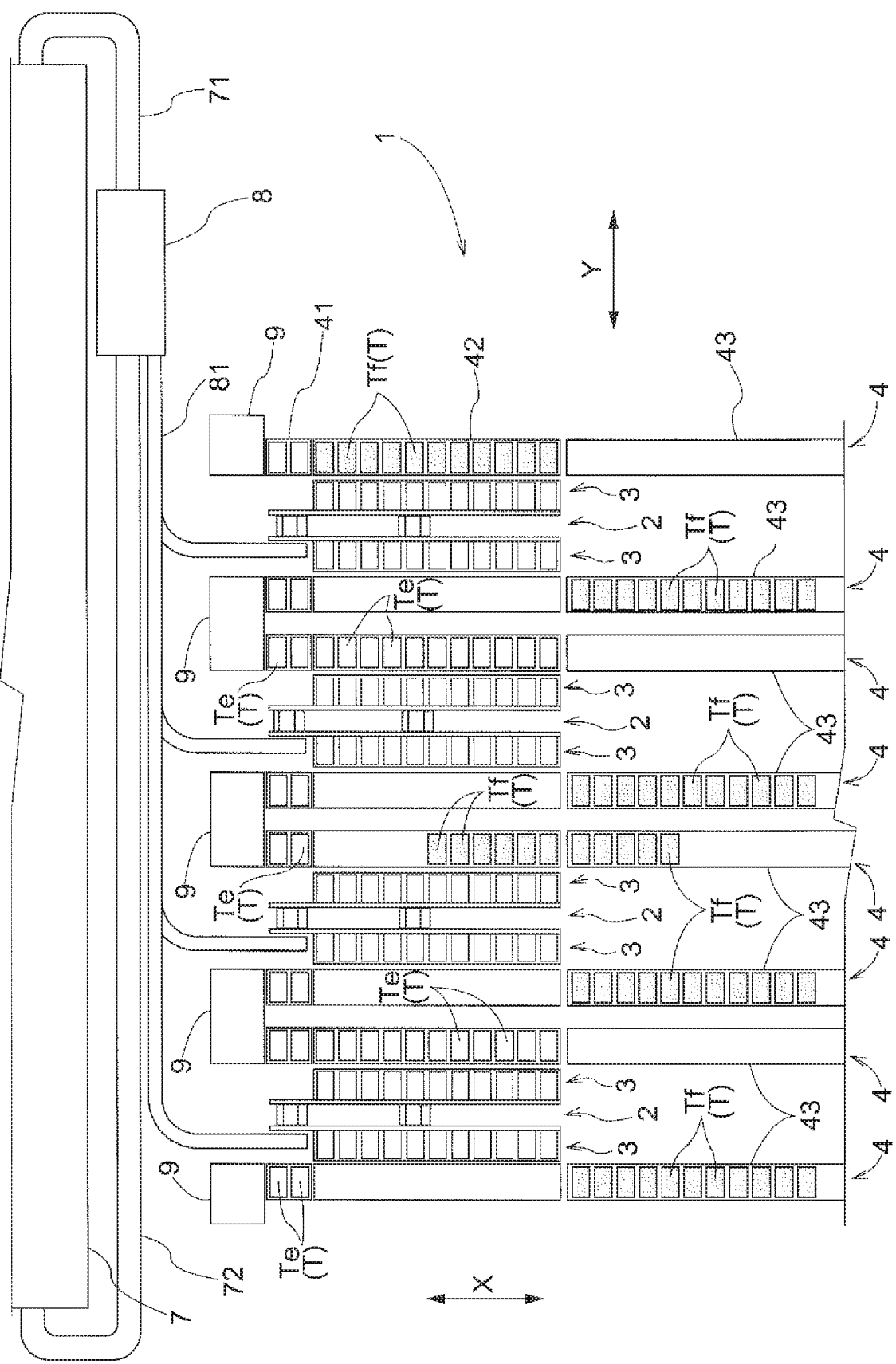
FIG. 1 is a schematic plan view of a picking system.

As shown in FIG. 1, the picking system 1 includes a multi-column sorting device 2, a storage device 3, a transport device 4, and an automatic warehouse 7 as its main components. In addition, the picking system 1 of the present embodiment includes an article unpacking portion 8 and an empty container supply device 9.

The automatic warehouse 7 is configured to store a plurality of articles A, and to automatically unload a specific article A when necessary. The articles A are housed and stored by type of articles in original package containers. The automatic warehouse 7 includes a plurality of columns of storage racks that store the original package containers in which the articles A are accommodated, and an unloading device that unloads, from the storage racks, an original package container in which a specific article A is accommodated. For example, the unloading device may be formed by a plurality of columns of transport trucks that are provided respectively corresponding to the columns of the storage racks, or may be a stacker crane, or the like.

An original package supply device 71 is connected to the automatic warehouse 7. The original package supply device 71 is a device for supplying an original package container unloaded from the automatic warehouse 7 toward the multi-column sorting device 2 side. For example, the original package supply device 71 may be a conveyor, a transport truck, a ceiling guided vehicle, or the like.

The article unpacking portion 8 is connected to the original package supply device 71. The article unpacking portion 8 is a portion for taking the articles A out of each original package container on a piece-by-piece basis, and supplying the articles A to the multi-column sorting device 2 side. In the article unpacking portion 8, the operator may manually perform the taking-out operation, or a robot arm or the like may automatically perform the taking-out operation.

An original package returning device 72 and an article supply device 81 are connected to the article unpacking portion 8. The original package returning device 72 is a device for allowing an original package container from which a required number of articles A have been taken out in the article unpacking portion 8 to be returned to and stored in the automatic warehouse 7. For example, the original package returning device 72 may be a conveyor, a transport truck, a ceiling guided vehicle, or the like. The article supply device 81 is a device for sequentially supplying, to the multi-column sorting device 2 side, the articles A taken out from the original package container in the article unpacking portion 8. For example, the article supply device 81 may be a conveyor, a transport truck, a ceiling guided vehicle, or the like.

The transport path of the article supply device 81 is branched into a plurality of paths (specifically, a number of paths that corresponds to the number of multi-column sorting devices 2), on the downstream side in the transport direction. Also, each of the plurality of branched paths extends to the corresponding multi-column sorting device 2. In this manner, a plurality of multi-column sorting devices 2 are connected in common to the automatic warehouse 7 via the article unpacking portion 8, and required articles A are supplied to each of the multi-column sorting devices 2 on a piece-by-piece basis. Note that the required article A may be an article of the type specified by an order (picking order) indicating the type and the number of articles A to be shipped (the articles A may be articles of a single type, or may be articles of a combination of a plurality of types).

The picking system 1 of the present embodiment includes a plurality of multi-column sorting devices 2. The multi-column sorting devices 2 are disposed parallel to each other with a predetermined interval therebetween in an arrangement direction Y.

Figure 2:
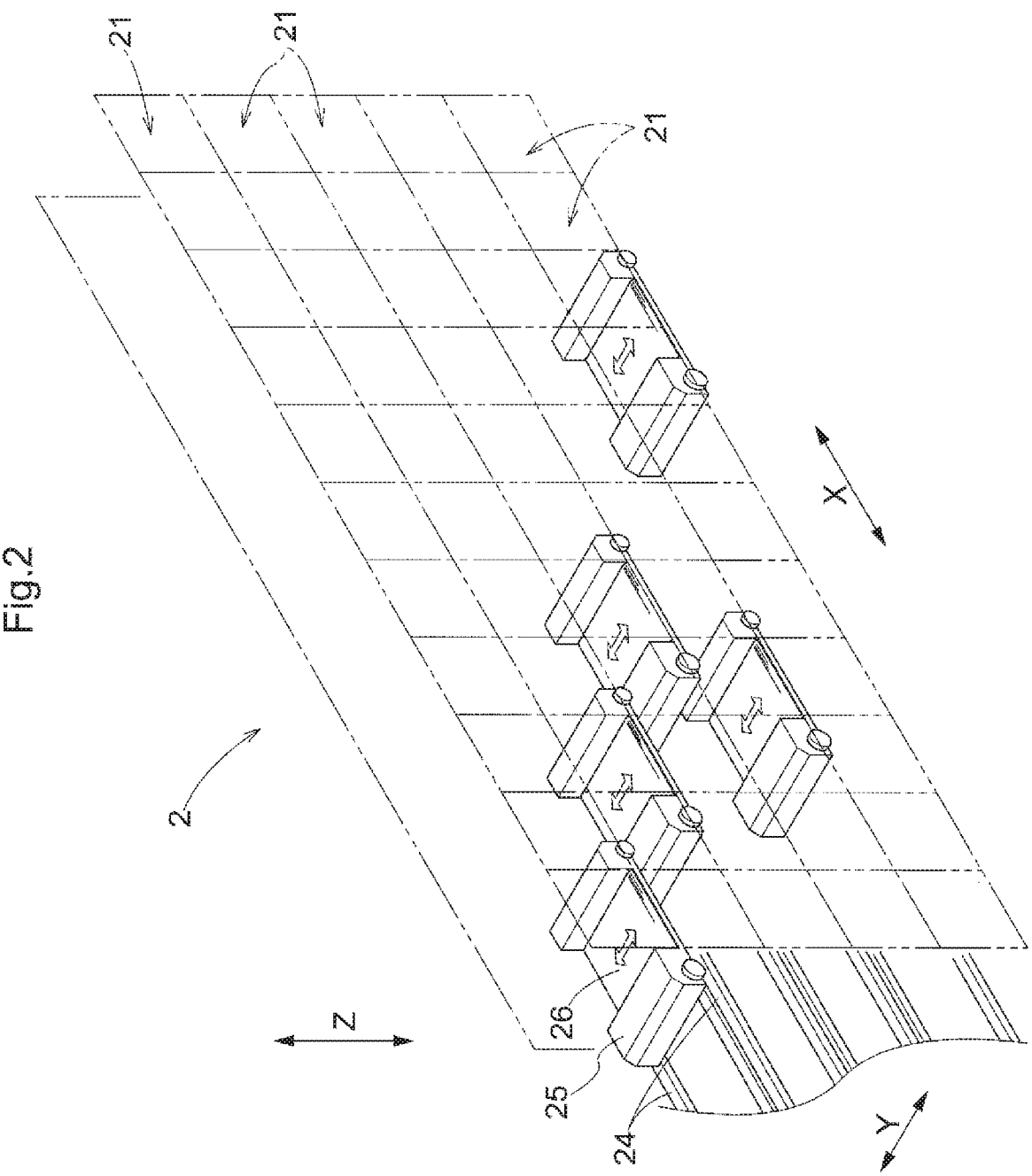
FIG. 2 is a perspective view of a multi-column sorting device.

As shown in FIG. 2, each multi-column sorting device 2 includes a plurality of columns of compartments 21 having different heights in a vertical direction Z. In addition, the multi-column sorting device 2 includes a plurality of rows of compartments 21 located at different position in a longitudinal direction X. That is, the multi-column sorting device 2 includes a plurality of compartments 21 arranged in an orthogonal grid composed of a plurality of columns and a plurality of rows. Here, for example, when the multi-column sorting device 2 includes a casing that surrounds its outer periphery, the compartments 21 may be a plurality of openings (window portions) formed in the casing. When the multi-column sorting device 2 is not particularly provided with such a casing, the compartments 21 may be virtual compartments that are set at positions facing the individual storage devices 3, which will be described below.

The number of columns of compartments 21 is not particularly limited, so long as the number is two or more. As the number of columns is increased, the number of orders that can be collectively processed at a time increases as will described below, which is preferable. However, if the number of columns is excessively increased, there are the possibilities of an increased initial cost and excessive processing capability. It is preferable that each multi-column sorting device 2 is a multi-column sorting device including, for example, about 5 to 30 columns of compartments 21. The number of rows of compartments 21 is not particularly limited, so long as the number is two or more, and may be about 5 to 40, for example.

Each multi-column sorting device 2 sorts the articles A based on an order into one of a plurality of compartments 21 composed of a plurality of columns and a plurality of rows, and discharges the articles A. Whereas a conventionally well-known sorting device is constituted by a single column and merely performs planar sorting (a single-column sorting device), the multi-column sorting device 2 performs three-dimensional sorting by using the columns having different heights in the vertical direction Z. Therefore, the number of orders that can be collectively processed at a time can be increased according to the number of columns of the multi-column sorting device 2. Also, the processing efficiency for sorting can be increased without expanding the planar installation space for the sorting device.

The multi-column sorting device 2 includes, on two sides in the arrangement direction Y, a plurality of compartments 21 composed of a plurality of columns and a plurality of rows. The multi-column sorting device 2 sorts the articles A based on an order, and discharges each article A into one of the plurality of compartments 21 on both sides in the arrangement direction Y. Such a configuration is also advantageous in that the number of orders that can be collectively processed at a time can be doubled.

As shown in FIG. 2, the multi-column sorting device 2 of the present embodiment includes a plurality of transport trucks 25 (specifically, the number of transport trucks 25 that corresponds to the number of columns of compartments 21). Traveling rails 24 respectively corresponding to the plurality of columns of compartments 21 are installed in the multi-column sorting device 2. The traveling rail 24 of each column is installed along the longitudinal direction X. Each transport truck 25 is configured to reciprocally travel on the traveling rail 24 of the corresponding column along that traveling rail 24 (along the longitudinal direction X). The transport truck 25 of each column is configured to be capable of stopping at positions corresponding to the plurality of rows of compartments 21.

A discharge conveyor 26 on which the article A is to be placed is fixed to each transport truck 25. The discharge conveyor 26 is driven in a direction (the arrangement direction Y) orthogonal to the traveling rail 24. The discharge conveyor 26 can be driven in both forward and reverse directions. When the discharge conveyor 26 is driven in a forward direction, the article A is discharged from the compartments 21 located on one side in the arrangement direction Y. When the discharge conveyor 26 is driven in a reverse direction, the article A is discharged from the compartments 21 located on the other side in the arrangement direction Y. In this manner, the multi-column sorting device 2 can discharge the articles A from the compartments 21 located on both sides in the arrangement direction Y.

Figure 3:
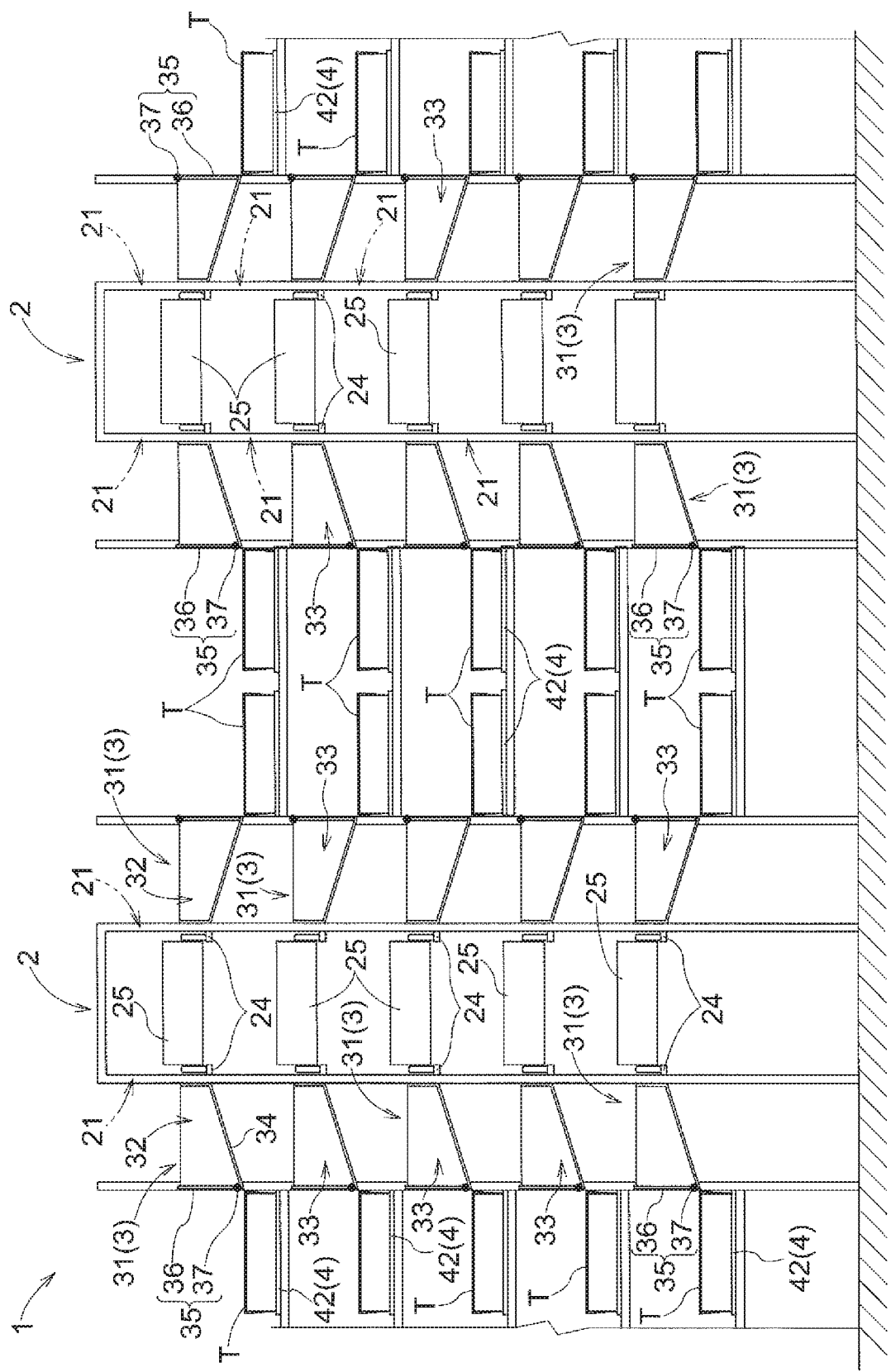
FIG. 3 is a side view of the picking system.

Each storage device 3 receives the articles A discharged from the compartments 21 of the corresponding multi-column sorting device 2, and temporarily stores the articles A. As shown in FIGS. 1 and 3, the storage devices 3 are provided in a plurality of columns respectively corresponding to the plurality of columns of compartments 21. Also, the storage devices 3 are provided in a plurality of rows respectively corresponding to the plurality of rows of compartments 21. That is, a plurality of the storage devices 3 are arranged in an orthogonal grid composed of a plurality of columns and a plurality of rows, respectively corresponding to the plurality of columns and a plurality of rows of compartments 21. The plurality of storage devices 3 arranged in an orthogonal grid composed of a plurality of columns and a plurality of rows are disposed on two sides in the arrangement direction Y relative to one multi-column sorting device 2.

As shown in FIG. 3, each of the storage devices 3 includes a cage member 31 that is open upward. The cage member 31 is also open at its end portion located opposite to the multi-column sorting device 2 in the arrangement direction Y. The storage device 3 includes a receiving port 32, a discharge port 33, and a transfer portion 34. The receiving port 32 is a portion for receiving the article A, and, specifically, the upper opening of the cage member 31 located on the multi-column sorting device 2 side corresponds to the receiving port 32. The discharge port 33 is a portion for discharging the article A, and, specifically, the end opening of the cage member 31 located opposite to the multi-column sorting device 2 corresponds to the discharge port 33. The transfer portion 34 is a portion for sending the article A from the receiving port 32 side to the discharge port 33 side. In the present example, the transfer portion 34 is formed by a fixed chute that is inclined downward from the receiving port 32 side toward the discharge port 33 side.

Each of the storage devices 3 according to the present embodiment further includes an opening/closing mechanism 35. The opening/closing mechanism 35 is provided at the discharge port 33 (the end opening of the cage member 31 located opposite to the multi-column sorting device 2). The opening/closing mechanism 35 can be switched between a state in which the discharge port 33 is closed, and a state in which the discharge port 33 is open. The opening/closing mechanism 35 of the present embodiment is formed by a gate opening/closing mechanism. The opening/closing mechanism 35 includes a door member 36 having a size corresponding to the size of the discharge port 33, and a fulcrum shaft 37 provided at an upper end portion or a lower end portion of the door member 36. By the door member 36 being pivoted with the fulcrum shaft 37 as the pivot center, the opening/closing mechanism 35 can be switched between a state (see FIG. 7, etc.) in which the discharge port 33 is closed by the door member 36, and a state (see FIG. 8) in which the discharge port 33 is open.

Note that the fulcrum shaft 37 is provided at an upper end portion of the door member 36 on one side (for example, the right side in FIG. 3) in the arrangement direction Y relative to the multi-column sorting device 2, and the fulcrum shaft 37 is provided at a lower end portion of the door member 36 on the other side (for example, the left side in FIG. 3). The storage device 3 in which the fulcrum shaft 37 is provided at a lower end portion of the door member 36 is suitable for temporarily storing, not only a small article A, but also a relatively large article A.

The opening/closing mechanism 35 of each of the storage devices 3 is kept in the state in which the discharge port 33 is closed, at least until article groups G that are each a set of articles A of the corresponding order have been collected. In the present embodiment, the opening/closing mechanisms 35 of the storage devices 3 are kept in the state in which the discharge ports 33 are closed, until the article groups G corresponding to all orders that are to be collectively processed at a time have been collected in the respective corresponding storage devices 3. In the present embodiment, the same number of orders as the number of the compartments 21 (the number of columns×the number of rows×2) included in one multi-column sorting device 2 are processed in one batch. In this case, the opening/closing mechanisms 35 are kept in the state in which the discharge ports 33 are closed, until the article groups G for the corresponding orders have been collected in all the storage devices 3 located on both sides of the one multi-column sorting device 2. In the present embodiment, a set of all the storage devices 3 located on both sides of one multi-column sorting device 2 corresponds to a "storage device group".

Figure 7:
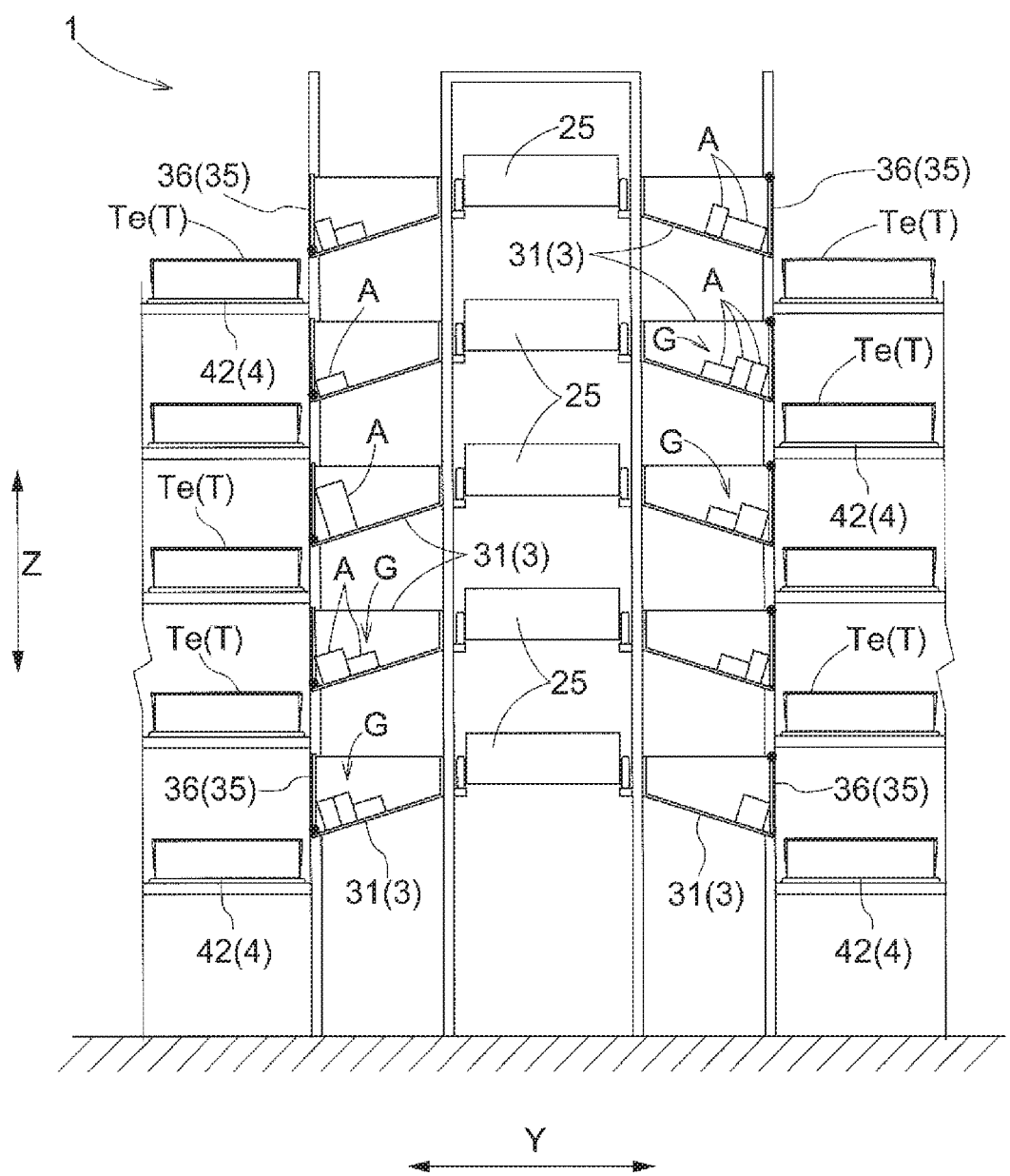
FIG. 7 is a diagram schematically showing a phase during operation of the picking system.
Figure 8:
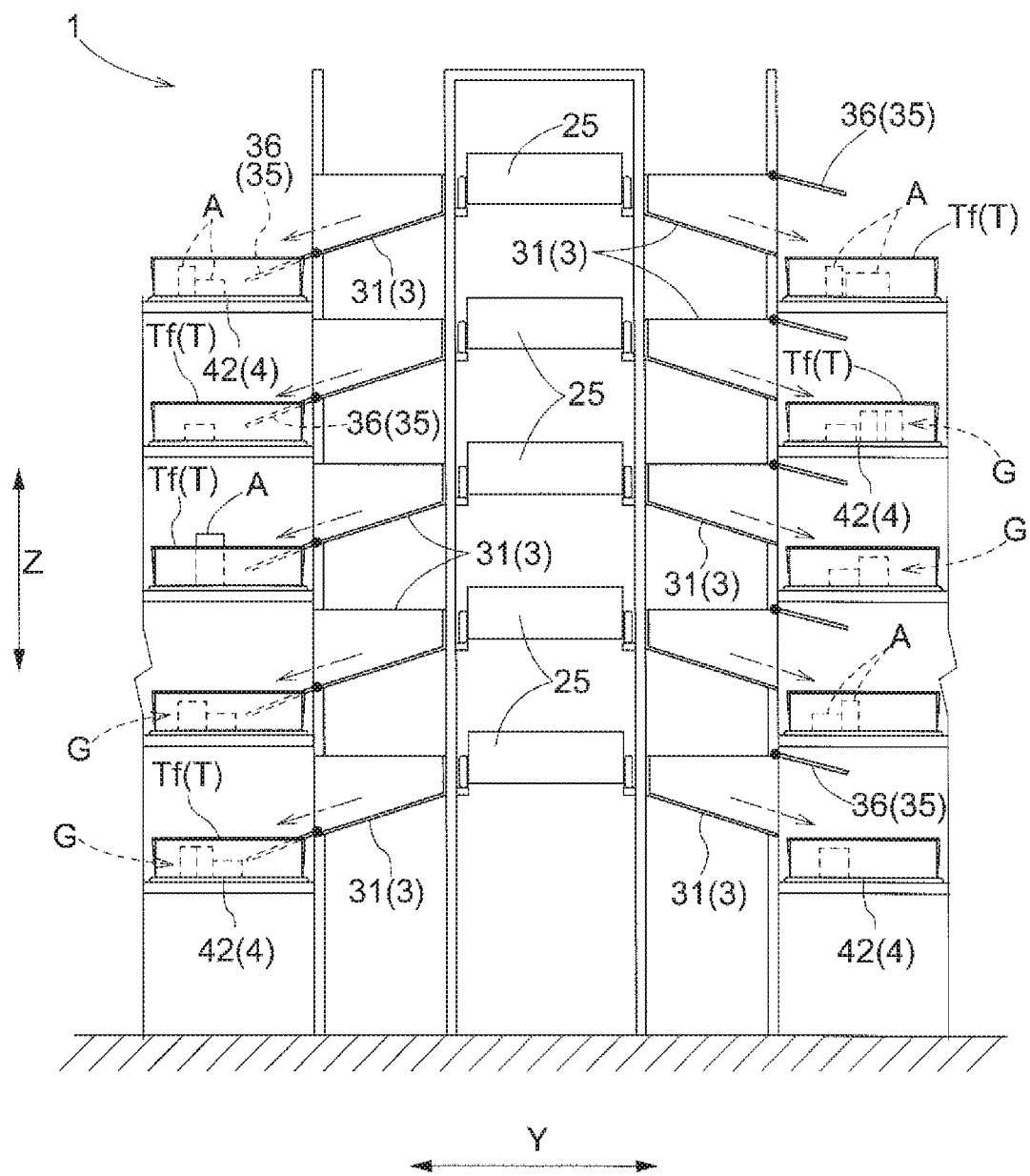
FIG. 8 is a diagram schematically showing a phase during operation of the picking system.

When the article groups G have been eventually collected in all the storage devices 3 located on both sides of one multi-column sorting device 2 (see FIG. 7), the opening/closing mechanisms 35 of all the storage devices 3 are then simultaneously brought into the state in which the discharge ports 33 are open (see FIG. 8). Inside the cage members 31 of the storage devices 3, each article A is subjected to a component of force by which the article A is moved toward the discharge port 33 by the transfer portion 34 (chute) using the action of gravity. Accordingly, when the discharge ports 33 are simultaneously opened, all the article groups G are simultaneously discharged from the discharge ports 33.

Each transport device 4 receives and unloads an article A discharged from the storage device 3 with an accommodating container T located at a standby position, and loads an empty accommodating container T to the standby position. Here, the standby position is a position located adjacent to the discharge port 33 in the arrangement direction Y relative to each storage device 3. As described above, the storage devices 3 are disposed on two sides in the arrangement direction Y relative to the multi-column sorting device 2. As shown in FIG. 3 and so forth, the transport device 4 located adjacent to the corresponding storage device 3 is also disposed on two sides in the arrangement direction Y relative to one multi-column sorting device 2. A transport device 4, a storage device 3, a multi-column sorting device 2, a storage device 3, and a transport device 4 are disposed in this order in the arrangement direction Y. These devices forms one unit, and a plurality of these units are disposed adjacent to each other in the arrangement direction Y. In the picking system 1 of the present embodiment, two such units located adjacent to each other in the arrangement direction Y each include a dedicated transport device 4. Note that an upwardly open tray or the like may be used as the accommodating container T.

As shown in FIG. 1, each of the transport devices 4 includes a loading conveyor 41, a dispensing conveyor 42, and an unloading conveyor 43. The loading conveyor 41, the dispensing conveyor 42, and the unloading conveyor 43 are provided in a plurality of columns respectively corresponding to the columns of the compartments 21 of the multi-column sorting device 2 (for the dispensing conveyor 42, see FIG. 3). In the present embodiment, the dispensing conveyor 42 corresponds to a "conveyor".

The loading conveyor 41 is provided between the empty container supply device 9 and the dispensing conveyor 42. The loading conveyor 41 loads, to the dispensing conveyor 42, an empty accommodating container T (hereinafter referred to as "empty accommodating container Te") supplied from the empty container supply device 9. The dispensing conveyor 42 is provided linearly along the multi-column sorting device 2 and the storage device 3 (along the longitudinal direction X). The empty accommodating containers Te are sequentially supplied to the dispensing conveyor 42 from the loading conveyor 41 at a predetermined interval, and the dispensing conveyor 42 supports the empty accommodating container Te thereon at each standby position.

When the opening/closing mechanisms 35 of the storage devices 3 are simultaneously opened, the article groups G that have been collected in the storage devices 3 slide down the transfer portions 34 (chutes), and are simultaneously accommodated in the empty accommodating containers Te waiting at the corresponding standby positions. Subsequently, the dispensing conveyors 42 of each column collectively unload all the accommodating containers T (hereinafter referred to as "actual accommodating containers Tf") in which the articles A (article groups G) are accommodated.

The unloading conveyor 43 is connected to the dispensing conveyor 42. The unloading conveyor 43 unloads the actual accommodating container Tf received from the dispensing conveyor 42 toward a shipping area. In the shipping area, the article groups G of each order are shipped individually, or the article groups G of a plurality of orders are shipped collectively.

Figure 4:
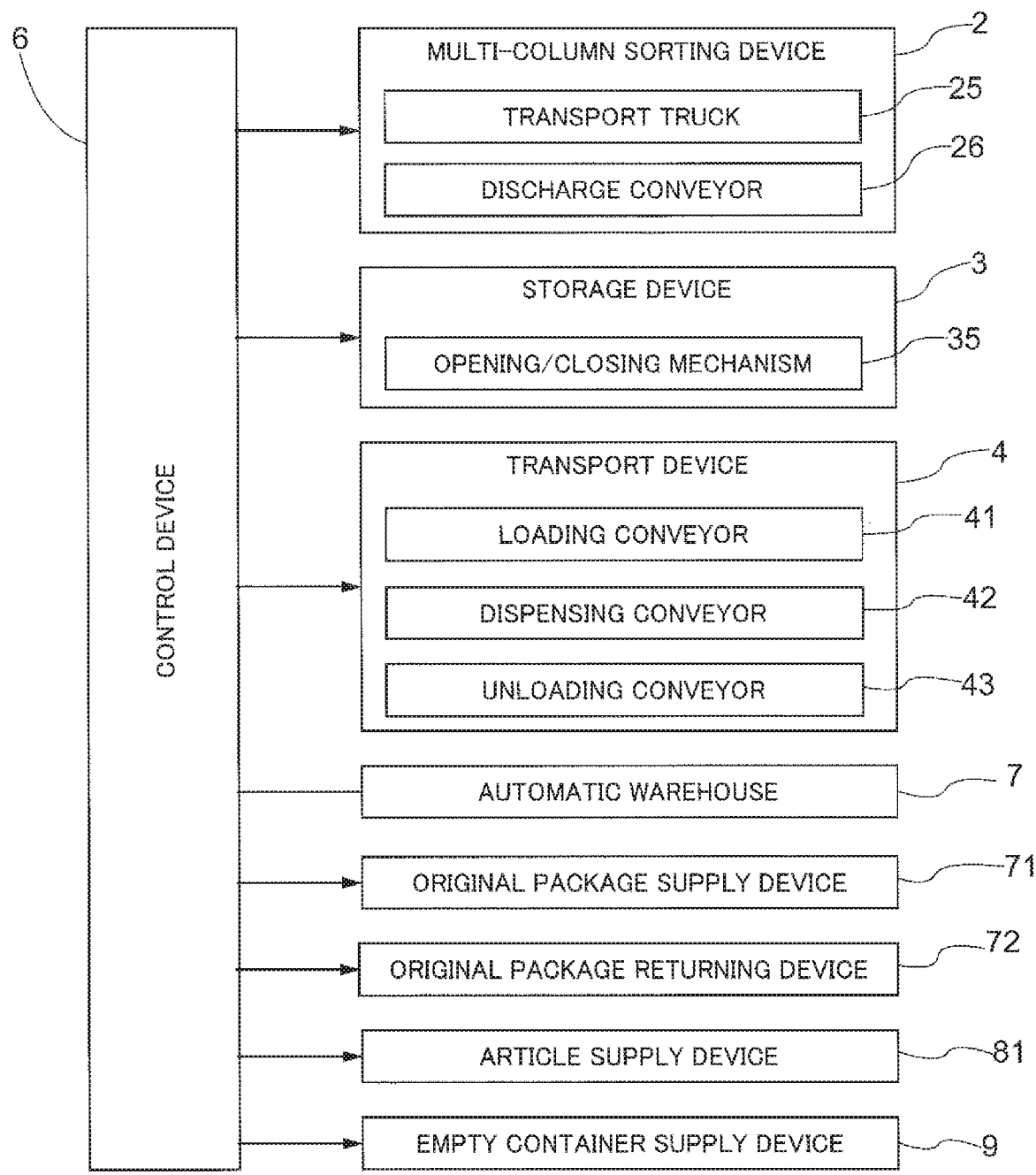
FIG. 4 is a control block diagram.

The picking system 1 includes a control device 6 that controls operations of various portions of the picking system 1. As shown in FIG. 4, the control device 6 controls operations of the multi-column sorting device 2 (the transport truck 25 and the discharge conveyor 26), the storage device 3 (the opening/closing mechanism 35), and the transport device 4 (the loading conveyor 41, the dispensing conveyor 42, and the unloading conveyor 43). In addition, the control device 6 controls operations of the automatic warehouse 7, the original package supply device 71, the original package returning device 72, the article supply device 81, and the empty container supply device 9. Specifically, the control device 6 controls operations of the various portions by controlling the driving of drive devices (e.g., drive motors) for driving the various portions.

The drive device (drive motor) for driving the opening/closing mechanism 35 may be provided individually for each of the storage devices 3, or may be shared by a plurality of storage devices 3. In the latter case, the respective opening/closing mechanisms 35 of a plurality of storage devices 3 belonging to the same column may be driven by one drive device (in this case, one drive device is provided for each column). Alternatively, the respective opening/closing mechanisms 35 of all the storage devices 3 may be driven by one drive device, for example. The range (section) of the storage devices 3 including the opening/closing mechanisms 35 that are driven collectively by one drive device may be appropriately set to a range other than the one described above.

Note that each article A and each accommodating container T are provided with an identification indicator such as a bar code and an IC tag. Reading devices such as a bar code reader and an IC tag reader are installed at a plurality of positions of the picking system 1, and the control device 6 is configured to obtain read information from each of the reading devices. Based on the read information, the control device 6 manages the positions of the articles A and the accommodating containers T.

Figure 5:
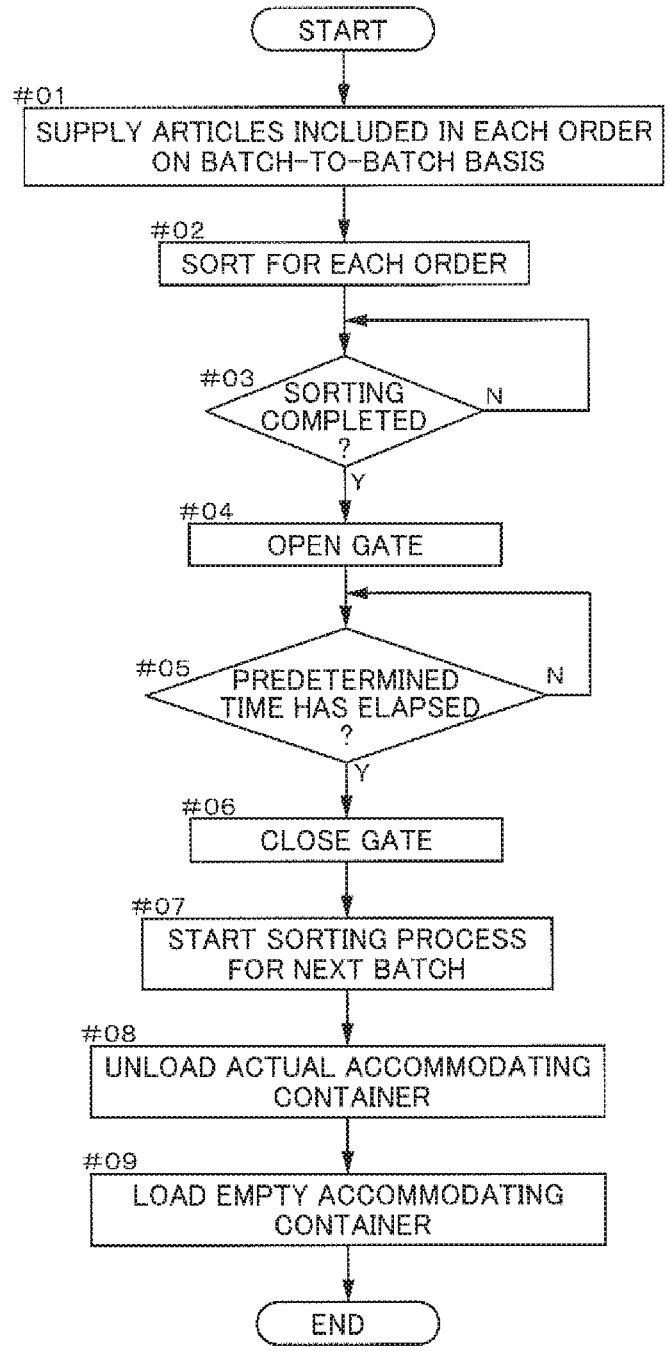
FIG. 5 is a flowchart illustrating an operation procedure of the picking system.

In the following, an example of the operation of the picking system 1 according to the present embodiment will be described. Here, an exemplary case will be described where, per one multi-column sorting device 2, the same number of orders as the number of compartments 21 (the number of columns×the number of rows×2) included in that multi-column sorting device 2 are collectively processed in one batch. As shown in FIG. 5, first, the articles A included in all of the orders constituting the batch are sequentially supplied to the multi-column sorting device 2 (step #01). At this time, based on all of the orders, the articles A of all types that are to be shipped are supplied, on a piece-by-piece basis, by a number of required articles A for each order.

Figure 6:
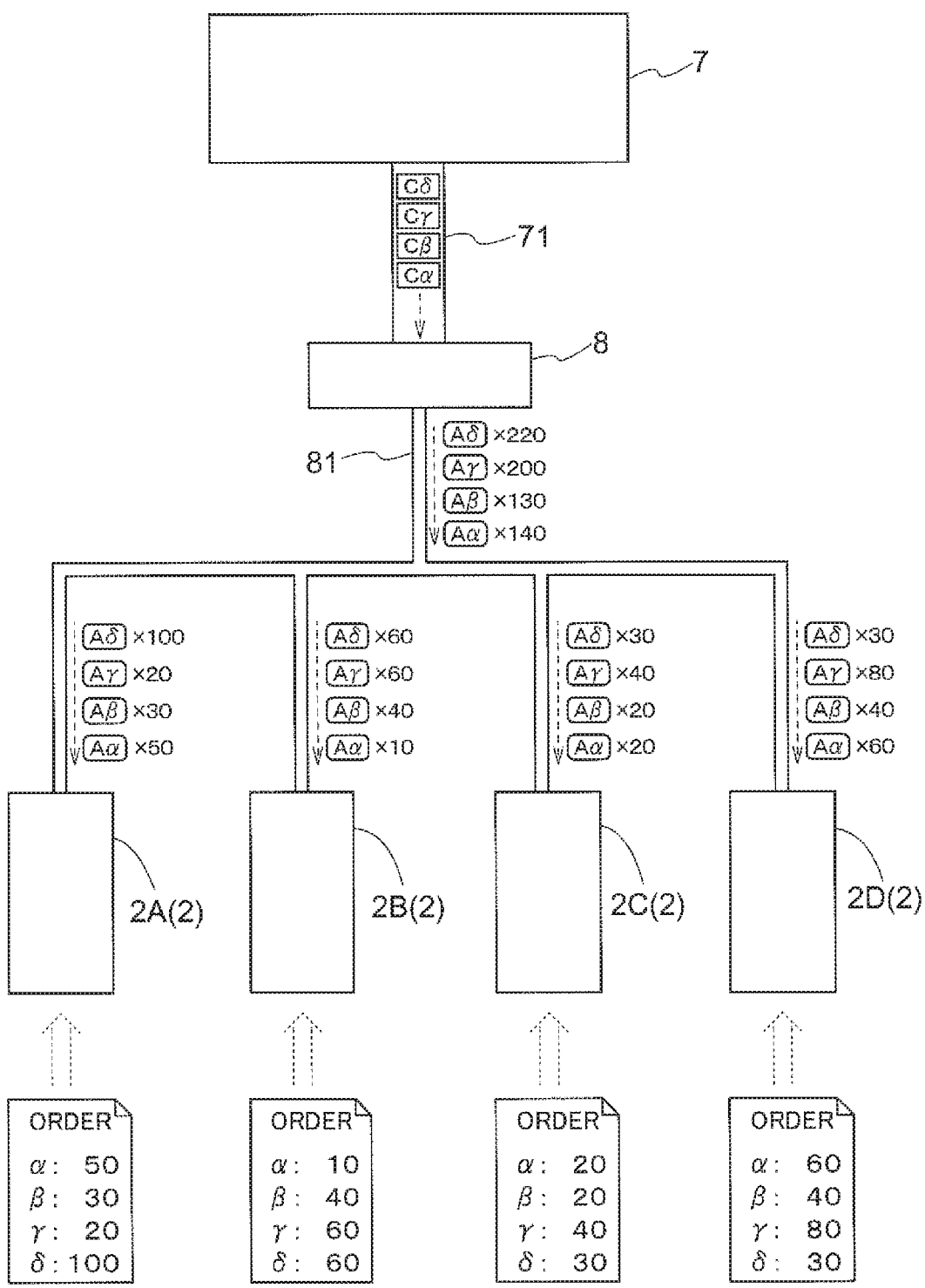
FIG. 6 is a diagram of a model illustrating how articles are supplied and distributed.

Note that when a plurality of multi-column sorting devices 2 are simultaneously operated, the articles A included in all of the orders respectively assigned to the plurality of multi-column sorting devices 2 are supplied collectively from the automatic warehouse 7 in an aggregated manner for each type. Subsequently, based on each order, the articles A are distributed to each of the multi-column sorting devices 2 by a required number of articles A. This will be described with reference to a simplified model shown in FIG. 6. In this diagram, "α" to "δ" represent the types of articles A. Also, "Aα" to "Aδ" represent the individual articles A (pieces) of the respective types, and "Cα" to "Cδ" represent the original package containers in which the articles A of the respective types are accommodated.

In this example, the total number of articles A of type α required for all the orders assigned to a first multi-column sorting device 2A is 50, the total number of articles A of type ß is 30, the total number of articles A of type γ is 20, and the total number of articles A of type δ is 100. The total number of articles A of type α required for all the orders assigned to a second multi-column sorting device 2B is 10, the total number of articles A of type ß is 40, the total number of articles A of type γ is 60, and the total number of articles A of type ß is 60. The total number of articles A of type α required for all the orders assigned to a third multi-column sorting device 2C is 20, the total number of articles A of type ß is 20, the total number of articles A of type γ is 40, and the total number of the articles A of type δ is 30. The total number of articles A of type α required for all the orders assigned to a fourth multi-column sorting device 2D is 60, the total number of articles A of type ß is 40, the total number of articles A of type γ is 80, and the total number of articles A of type δ is 30.

In this case, the four multi-column sorting devices 2A to 2D as a whole requires 140 articles A of type α, 130 articles A of type ß, 200 articles A of type γ, and 220 articles A of type δ. Accordingly, an original package container in which 140 or more articles A of type α are accommodated, an original package container in which 130 or more articles A of type β are accommodated, an original package container in which 200 or more articles A of type γ are accommodated, and an original package container in which 220 or more articles A of type δ are accommodated are unloaded from the automatic warehouse 7. Note that when an original package container in which articles A of each type are accommodated cannot accommodate the required number of articles A, the articles A may be separately accommodated in a plurality of original package containers.

Subsequently, in the article unpacking portion 8, the articles A are taken out on a piece-by-piece basis from the original package container for each type. At this time, 140 articles A of type α, 130 articles A of type β, 200 articles A of type γ, and 220 articles A of type δ are taken out, and sequentially sent to the multi-column sorting devices 2 side. Then, the required number of articles A of each type are distributed and supplied to the corresponding one of the multi-column sorting devices 2A to 2D.

The articles A that are sequentially supplied to a multi-column sorting device 2 are sorted for each order by the multi-column sorting device 2 (#02). Each of the plurality of (the number of columns×the number of rows×2) of compartments 21 included in one multi-column sorting device 2 is associated with one order. Accordingly, each article A is transported with the transport truck 25 by the multi-column sorting device 2 to the position of a compartment 21 corresponding to the order including that article A, and thereafter discharged from that compartment 21 with the discharge conveyor 26.

Note that the article A discharged from each compartment 21 is stored in the storage device 3 in a state in which the discharge port 33 is closed, as shown in FIG. 7. This process is continued until sorting for all the orders included in one batch is completed, or in other words, until the article groups G have been collected in all the storage devices 3 (#03).

When sorting for all the orders is completed (#03: Yes), the opening/closing mechanisms 35 of all the storage devices 3 are simultaneously opened as shown in FIG. 8 (#04). Then, the article groups G that have been temporarily stored in the storage devices 3 simultaneously slide down the transfer portions 34 (chutes) to be discharged, and are accommodated in the corresponding empty accommodating containers Te that have been waiting on the dispensing conveyor 42. Thereafter, when a predetermined time (e.g., 1 second to 5 seconds, which may be changed as appropriate) has elapsed (#05: Yes), the opening/closing mechanisms 35 of all the storage devices 3 are simultaneously closed (#06).

Figure 9:
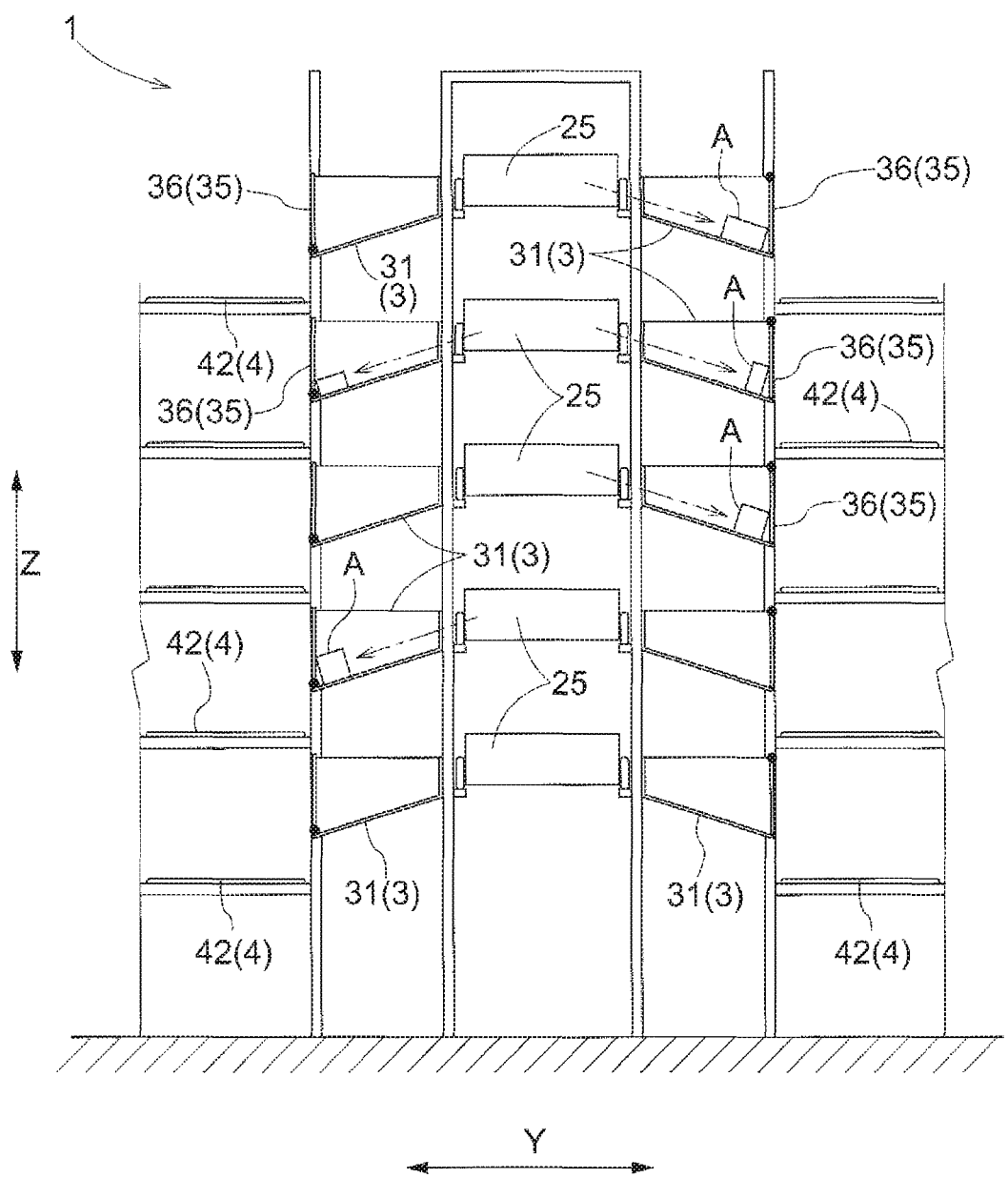
FIG. 9 is a diagram schematically showing a phase during operation of the picking system.
Figure 10:
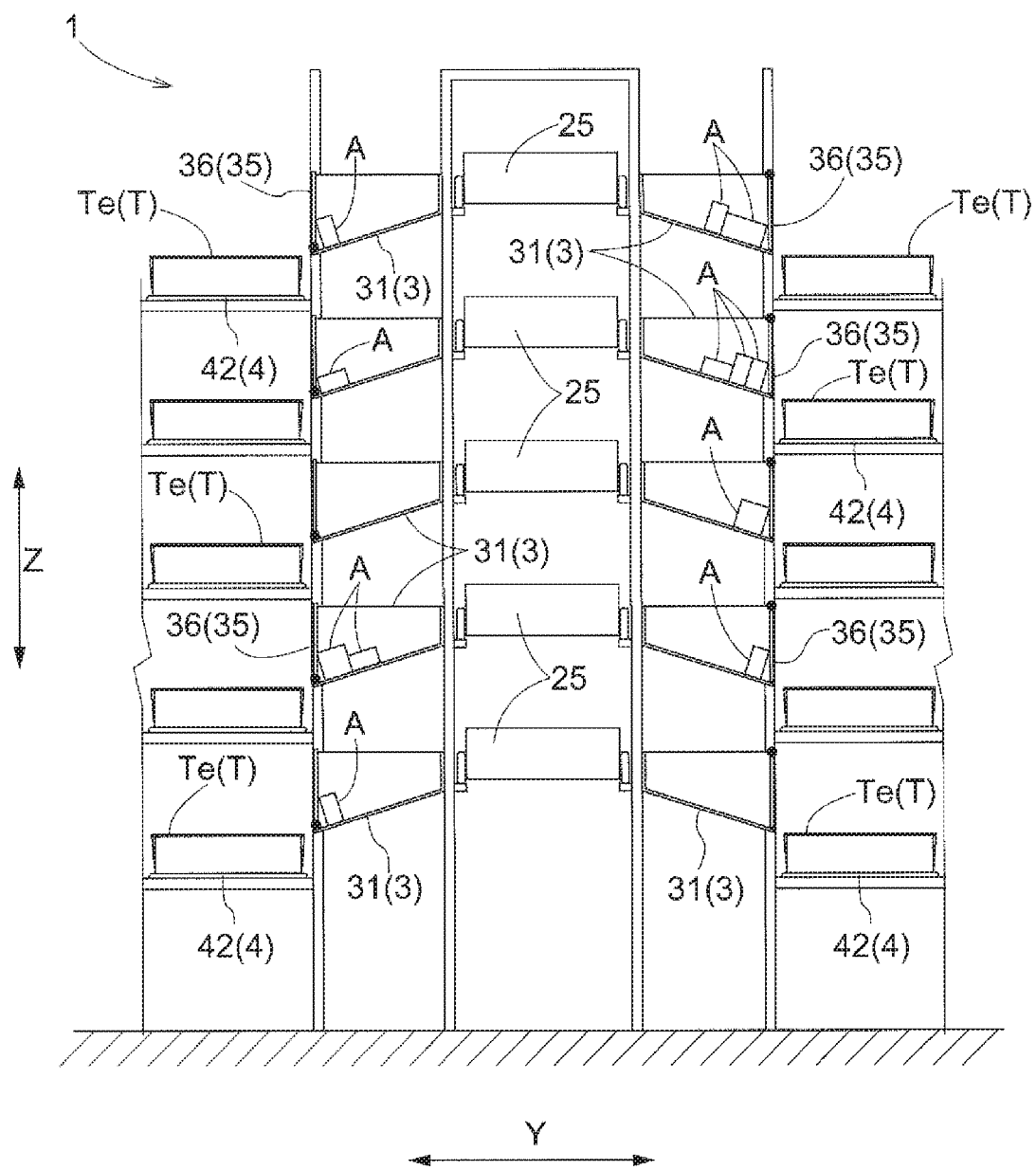
FIG. 10 is a diagram schematically showing a phase during operation of the picking system.

After the opening/closing mechanisms 35 have been closed, a sorting process for the next batch is started as shown in FIG. 9 (#7). That is, the processes of steps #01 and #02 are started for a plurality of orders included in the next batch. In parallel with the processes, the actual accommodating container Tf on the dispensing conveyor 42 is unloaded with the unloading conveyor 43 (#08). As a result of this unloading process, no accommodating container T is present at each standby position. Accordingly, to compensate for the absence, an empty accommodating container Te is loaded from the loading conveyor 41 onto the dispensing conveyor 42 as shown in FIG. 10 (#09). Then, in that state, the procedure waits for completion of the sorting process that is being executed at that time (#03). The above-described processes are sequentially repeated.

Since the picking system 1 of the present embodiment performs the sorting process with the multi-column sorting device 2 including a plurality of compartments 21 composed of a plurality of columns and a plurality of rows, it is possible to increase the number of orders that can be collectively processed at a time. Moreover, the multi-column sorting device 2 includes a plurality of compartments 21 on two sides in the arrangement direction Y, and it is thus possible to further increase the number of orders that can be collectively processed at a time. Accordingly, it is possible to increase the processing efficiency for sorting, without expanding the planar installation space for the sorting device.

Since the picking system 1 of the present embodiment includes the storage device 3 between the multi-column sorting device 2 and the transport device 4, the unloading process for the actual accommodating containers Tf generated in the previous batch can be performed in parallel during a sorting process performed by the multi-column sorting device 2. During the sorting process, a loading process for the empty accommodating containers Te for receiving the article groups G collected in the current batch can be performed in parallel. Thus, it is possible to increase the overall processing efficiency of the system. The time required for batch switching is only a predetermined time (e.g., 1 seconds to 5 seconds) during which the opening/closing mechanisms 35 of the storage devices 3 are open, and the batch switching time can be significantly reduced.

Furthermore, since the picking system 1 of the present embodiment includes the loading conveyor 41, the dispensing conveyor 42, and the unloading conveyor 43 as the transport device 4, unloading of the actual accommodating containers Tf and loading of the empty accommodating containers Te can each be performed automatically and smoothly. Thus, unloading after sorting and preparation for the next unloading can be performed efficiently. In this respect as well, it is possible to increase the overall processing efficiency of the system.

Other Embodiments (1) The above embodiment has described an example in which each multi-column sorting device 2 includes a plurality of transport trucks 25 including a discharge conveyor 26. However, the present disclosure is not limited to such a configuration. For example, the multi-column sorting device 2 may include a plurality of columns of slat conveyors in which a pushing mechanism is provided at a position corresponding to each compartment 21, for example. A multi-column sorting device 2 having any structure can be used so long as the multi-column sorting device 2 sorts the articles A into one of a plurality of compartments 21, and discharges the articles A.

(2) The above embodiment has described, as an example, a configuration in which the multi-column sorting device 2 includes the compartments 21 on both sides in the arrangement direction Y, and the storage device 3 and the transport device 4 are disposed on two sides in the arrangement direction Y relative to one multi-column sorting device 2. However, the present disclosure is not limited to such a configuration. For example, the multi-column sorting device 2 may include the compartments 21 only on one side in the arrangement direction Y, and the storage device 3 and the transport device 4 may be disposed only on the side where the compartments 21 are provided.

(3) The above embodiment has described, as an example, a configuration in which the picking system 1 includes a plurality of multi-column sorting devices 2. However, the present disclosure is not limited to such a configuration. For example, the picking system 1 may include only one multi-column sorting device 2.

(4) The above embodiment has described an example in which the transfer portion 34 of the storage device 3 is formed by a fixed chute. However, the present disclosure is not limited to such a configuration. For example, the transfer portion 34 may be formed by a movable (tilting) chute. Alternatively, the transfer portion 34 may be formed by a conveyor, a pusher, or the like, for example. In these cases, the storage device 3 may not be provided with the opening/closing mechanism 35.

Figure 11:
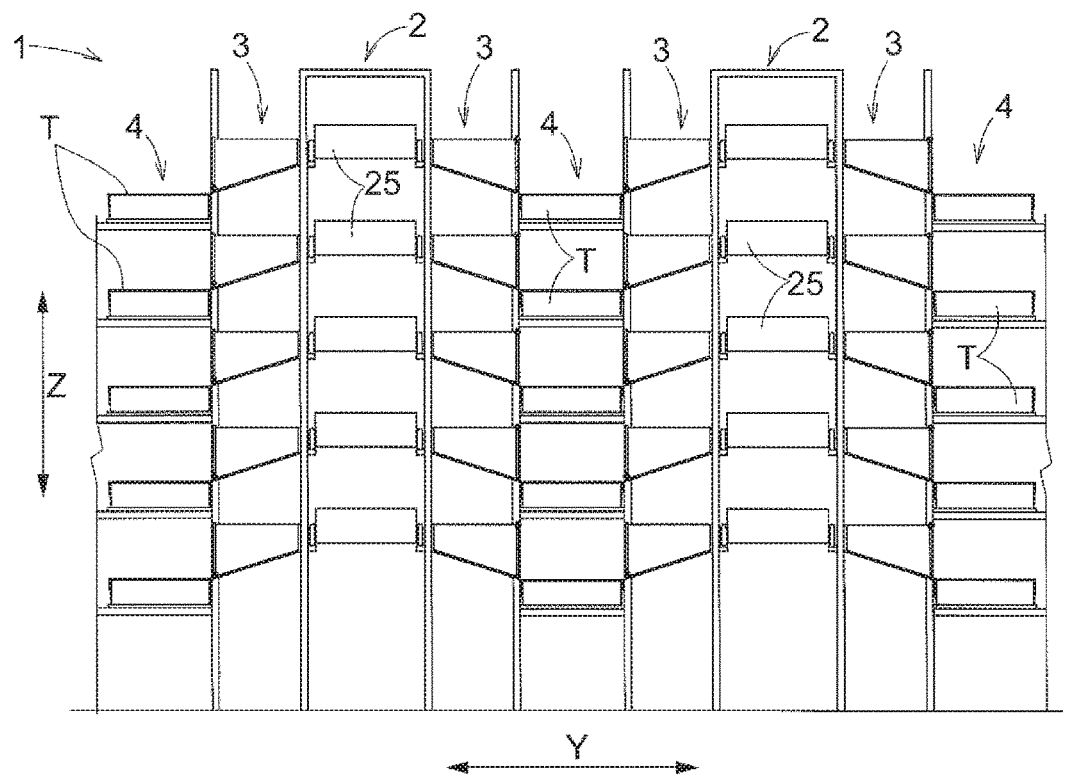
FIG. 11 is a side view of a picking system according to another embodiment.

(5) The above embodiment has described, as an example, a configuration in which two dedicated transport devices 4 are provided per one multi-column sorting device 2. However, the present disclosure is not limited to such a configuration. For example, as shown in FIG. 11, a transport device 4 located between two multi-column sorting devices 2 that are adjacent to each other in the arrangement direction Y may be shared by the two multi-column sorting devices 2. In this case, the shared transport device 4 performs, at different timings, both unloading of the actual accommodating containers Tf (articles A) from the side of one of the multi-column sorting device 2, and unloading of the actual accommodating containers Tf (articles A) from the other multi-column sorting device 2 side. Similarly, the shared transport device 4 performs, at different timings, both loading of the empty accommodating containers Te to one of the multi-column sorting devices 2, and loading of the empty accommodating containers Te to the other multi-column sorting device 2. Such a configuration is advantageous in that it can achieve space saving and cost reduction although the number of orders that can be collectively processed at a time is reduced to half as compared with a configuration in which two dedicated transport devices 4 are provided for each multi-column sorting device 2.

Figure 12:
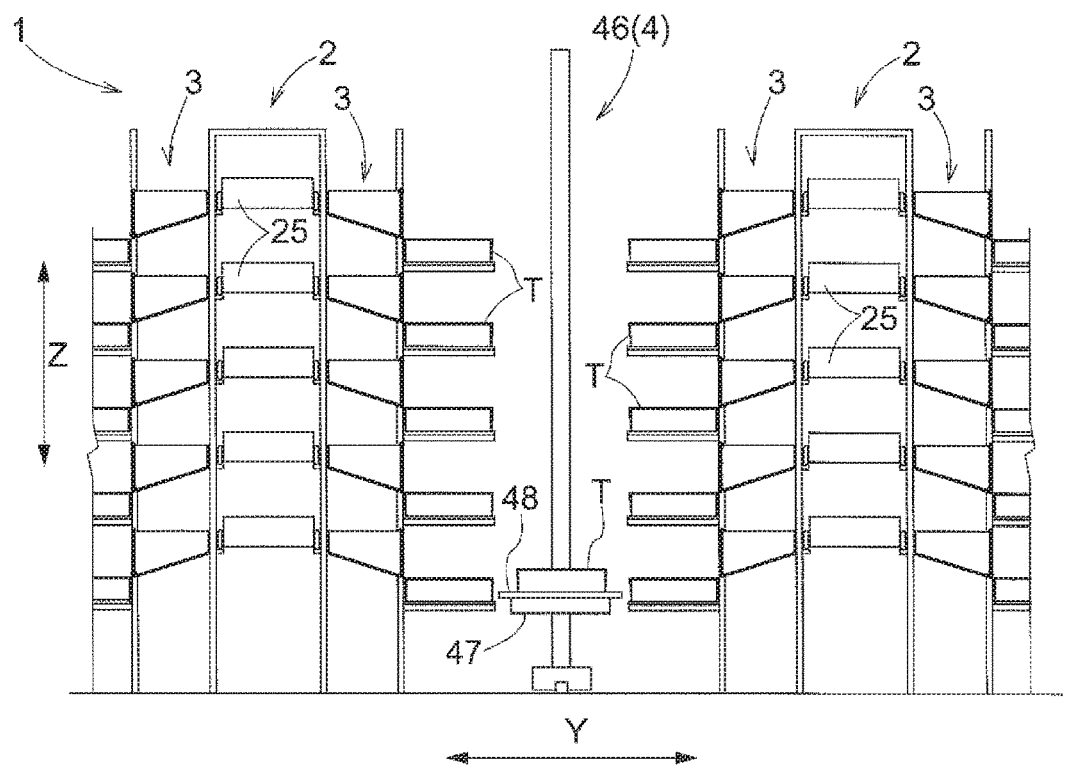
FIG. 12 is a side view of a picking system according to still another embodiment.

(6) The above embodiment has described a configuration in which each of the transport devices 4 includes a plurality of columns of loading conveyors 41, dispensing conveyors 42, and unloading conveyors 43. However, the present disclosure is not limited to such a configuration. For example, as shown in FIG. 12, the transport device 4 may include a stacker crane 46 including a moving device 47 and a transfer device 48, in place of the dispensing conveyors 42. Alternatively, the transport device 4 may include a transport truck that travels on a traveling rail, in place of the dispensing conveyors 42. As in these cases, the transport device 4 (stacker crane 46) may not necessarily unload a plurality of accommodating containers T simultaneously, and may sequentially unload the accommodating containers T one by one, or by a predetermined number of accommodating containers T.

(7) The above embodiment has described, as an example, a configuration in which the same number of orders as the number of compartments 21 (the number of columns×the number of rows×2) included in one multi-column sorting device 2 are collectively processed in one batch. However, the present disclosure is not limited to such a configuration, and the number of orders that are collectively processed in one batch may be changed as appropriate.

(8) The configurations disclosed in the embodiments described above (including the above-described embodiment and other embodiments; the same applies to the following) are applicable in combination with configurations disclosed in other embodiments so long as no inconsistency arises. With regard to the other configurations as well, the embodiments disclosed herein are in all respects as illustrative, and appropriate changes and modifications may be made thereto without departing from the scope and spirit of the present disclosure.

Outline of the Embodiment

To summarize the foregoing, preferably, a picking system according to the present disclosure includes the following configurations.

A picking system that collects and ships a required article from among a plurality of stored articles, the picking system including:

a multi-column sorting device that includes a plurality of columns of compartments having different heights in a vertical direction, and that sorts the articles based on an order, and discharges each of the articles into one of the plurality of columns of compartments;

a plurality of storage devices that are provided in a plurality of columns respectively corresponding to the plurality of columns of compartments, receive the articles discharged from the respective corresponding compartments until article groups that are each a set of the articles for each order have been collected, and temporarily store the articles; and a transport device that receives and unloads the article discharged from each of the storage devices with an accommodating container located at a standby position, and loads an empty accommodating container to the standby position.

With this configuration, the sorting device that sorts articles based on an order is formed by a multi-column sorting device including a plurality of columns of compartments. Accordingly, the number of orders that can be collectively processed at a time can be increased using the columns having different heights in the vertical direction. That is, it is possible to increase the processing efficiency for sorting without expanding the planar installation space of the sorting device. With this configuration, the articles discharged from the compartments are temporarily stored in the storage device until the article groups of each order have been collected, and, thereafter, transferred to the accommodating containers and automatically unloaded by the transport device. As a result of this unloading process, no accommodating container is present on each standby position. To compensate for the absence, an empty accommodating container is automatically loaded by the transport device. In this manner, unloading of the accommodating container in which the article groups of each order are accommodated, and loading of the empty accommodating container are automatically performed by the transport device. Thus, unloading after sorting and preparation for the next unloading can be performed efficiently. As such, it is possible to realize a picking system that can efficiently perform operations from the collection to the shipping of articles in a limited space.

As an aspect, it is preferable that each of the storage devices includes a receiving port for receiving the article, a discharge port for discharging the article, and a transfer portion for sending the article from the receiving port side to the discharge port side.

With this configuration, the articles discharged from the compartments of the multi-column sorting device can be received from the receiving port, and appropriately stored in the storage device. By allowing the transfer portion to exert the action of sending articles to the discharge port side, the temporarily stored article groups can be appropriately discharged from the storage device. Thus, it is possible to ensure the necessary function of the storage device.

As an aspect, it is preferable that the transfer portion is a chute that is inclined downward from the receiving port side toward the discharge port side, and each of the storage devices further includes an opening/closing mechanism that is provided at the corresponding discharge port, and that can be switched between a state in which the discharge port is closed and a state in which the discharge port is open.

With this configuration, it is possible to send articles from the receiving port side to the discharge port side by a simple configuration using the action of gravity, without providing any special mechanism such as a conveyor or a pusher, for example. With this configuration, the discharge of articles from a discharge port is restricted in a state in which the opening/closing mechanism closes the discharge port. Accordingly, the articles received from the compartments of the multi-column sorting device can be appropriately stored in the storage device. On the other hand, the restriction of discharge of articles from a discharge port is cancelled by the opening/closing mechanism opening the discharge port. Accordingly, by allowing the transfer portion formed by a chute to exert the action of sending articles to the discharge port side in that state, the temporarily stored article groups can be appropriately discharged from the storage device. Thus, it is possible to ensure the necessary function of the storage device, while simplifying the structure.

As an aspect, it is preferable that the transport device collectively unloads, as an unloading unit, a plurality of the accommodating containers in which the articles are accommodated, and, taking a set of a plurality of the storage devices respectively corresponding to a plurality of the accommodating containers included in one unloading unit as a storage device group, the article groups are simultaneously discharged from all the storage devices of the storage device group after the article groups have been collected for all the storage device groups.

With this configuration, article groups are discharged, not individually, but in an aggregated manner from a plurality of storage devices, and at least a portion of the drive mechanism for performing the discharge can be shared. Accordingly, it is possible to simplify the structure and the control of the storage device.

As an aspect, it is preferable that the multi-column sorting device includes the compartments on two sides in an arrangement direction of the multi-column sorting device, the storage device, and the transport device, and the storage device and the transport device are disposed on two sides in the arrangement direction relative to the multi-column sorting device.

With this configuration, the number of orders that can be collectively processed at a time can be doubled as compared with a configuration in which the multi-column sorting device includes the compartments only on one side and discharges articles only to the one side.

As an aspect, it is preferable that a plurality of the multi-column sorting devices are provided along the arrangement direction, and the transport device located between two multi-column sorting devices that are adjacent to each other in the arrangement direction is configured to perform both unloading of the articles from one of the multi-column sorting devices, and unloading of the articles from the other multi-column sorting device.

With this configuration, one transport device is shared by two multi-column sorting devices, and it is therefore possible to achieve space saving and cost reduction as compared with a configuration in which two transport devices respectively dedicated to two multi-column sorting devices adjacent to each other in the arrangement direction are installed therebetween.

As an aspect, it is preferable that the transport device includes a plurality of conveyors provided in a plurality of columns respectively corresponding to the plurality of storage devices.

With this configuration, while the conveyor of each column waits in a state in which the conveyor supports the accommodating container that receives the article discharged from the storage device, the article received with the accommodating container can be directly unloaded. Accordingly, it is possible to minimize the installation space for the transport device in the arrangement direction of the multi-column sorting device, the storage device, and the transport device.

As an aspect, it is preferable that the picking system further includes an automatic warehouse that stores the articles, wherein a plurality of the multi-column sorting devices are provided, and the plurality of multi-column sorting devices are connected in common to the automatic warehouse, and the articles included in the orders respectively corresponding to the plurality of multi-column sorting devices are supplied from the automatic warehouse in an aggregated manner for each type, and subsequently distributed to the respective corresponding multi-column sorting devices by a required number of articles.

With this configuration, it is possible to reduce the amount of operation of the automatic warehouse as compared with a configuration in which the articles included in each order are sequentially supplied to individual multi-column sorting devices from the automatic warehouse side. Accordingly, articles can be smoothly supplied from the automatic warehouse to each of the plurality of multi-column sorting devices. Furthermore, it is possible to increase the overall processing efficiency of the system.

It is sufficient that the picking system according to the present disclosure can achieve at least one of the above-described effects.

What is claimed is:

1. A picking system that collects and ships a required article from among a plurality of stored articles, the picking system comprising:
   a multi-column sorting device that includes a plurality of columns of compartments provided at different heights in a vertical direction, and sorts the articles based on an order, and discharges each of the articles into one of the plurality of columns of compartments;
   a plurality of storage devices that are provided in a plurality of columns respectively corresponding to the plurality of columns of compartments, receive the articles discharged from the respective corresponding compartments until article groups that are each a set of the articles for each order have been collected, and temporarily store the articles;
   a transport device that receives and unloads the article discharged from each of the storage devices with an accommodating container located at a standby position, and loads an empty accommodating container to the standby position; and
   a control device that controls operations of the multi-column sorting device, the storage device, and the transport device.

2. The picking system according to claim 1, wherein each of the storage devices includes a receiving port for receiving the article, a discharge port for discharging the article, and a transfer portion for sending the article from the receiving port side to the discharge port side.

3. The picking system according to claim 2, wherein the transfer portion is a chute that is inclined downward from the receiving port side toward the discharge port side, and wherein each of the storage devices further includes an opening/closing mechanism that is provided at the corresponding discharge port, and that can be switched between a state in which the discharge port is closed and a state in which the discharge port is open.

4. The picking system according to claim 2, wherein the transport device collectively unloads, as an unloading unit, a plurality of the accommodating containers in which the articles are accommodated, and wherein taking a set of a plurality of the storage devices respectively corresponding to a plurality of the accommodating containers included in one unloading unit as a storage device group, the article groups are simultaneously discharged from all the storage devices of the storage device group after the article groups have been collected for all the storage device groups.

5. The picking system according to claim 1, wherein the multi-column sorting device includes the compartments on two sides in an arrangement direction of the multi-column sorting device, the storage device, and the transport device, and wherein the storage device and the transport device are disposed on two sides in the arrangement direction relative to the multi-column sorting device.

6. The picking system according to claim 5, wherein a plurality of the multi-column sorting devices are provided along the arrangement direction, and wherein the transport device located between two multi-column sorting devices that are adjacent to each other in the arrangement direction is configured to perform both unloading of the articles from one of the multi-column sorting devices, and unloading of the articles from the other multi-column sorting device.

7. The picking system according to claim 1, wherein the transport device includes a plurality of conveyors provided in a plurality of columns respectively corresponding to the plurality of storage devices.

8. The picking system according to claim 1, further comprising:

an automatic warehouse that stores the articles, wherein a plurality of the multi-column sorting devices are provided, and the plurality of multi-column sorting devices are connected in common to the automatic warehouse, and wherein the articles included in the orders respectively corresponding to the plurality of multi-column sorting devices are supplied from the automatic warehouse in an aggregated manner for each type, and subsequently distributed to the respective corresponding multi-column sorting devices by a required number of articles.

9. The picking system according to claim 1, wherein the multi-column sorting device includes at least one transport truck having a discharge conveyor or at least one slat conveyor having a pushing mechanism, the number of which corresponds to the number of the columns of compartments.

* * * * *